United States Patent Office

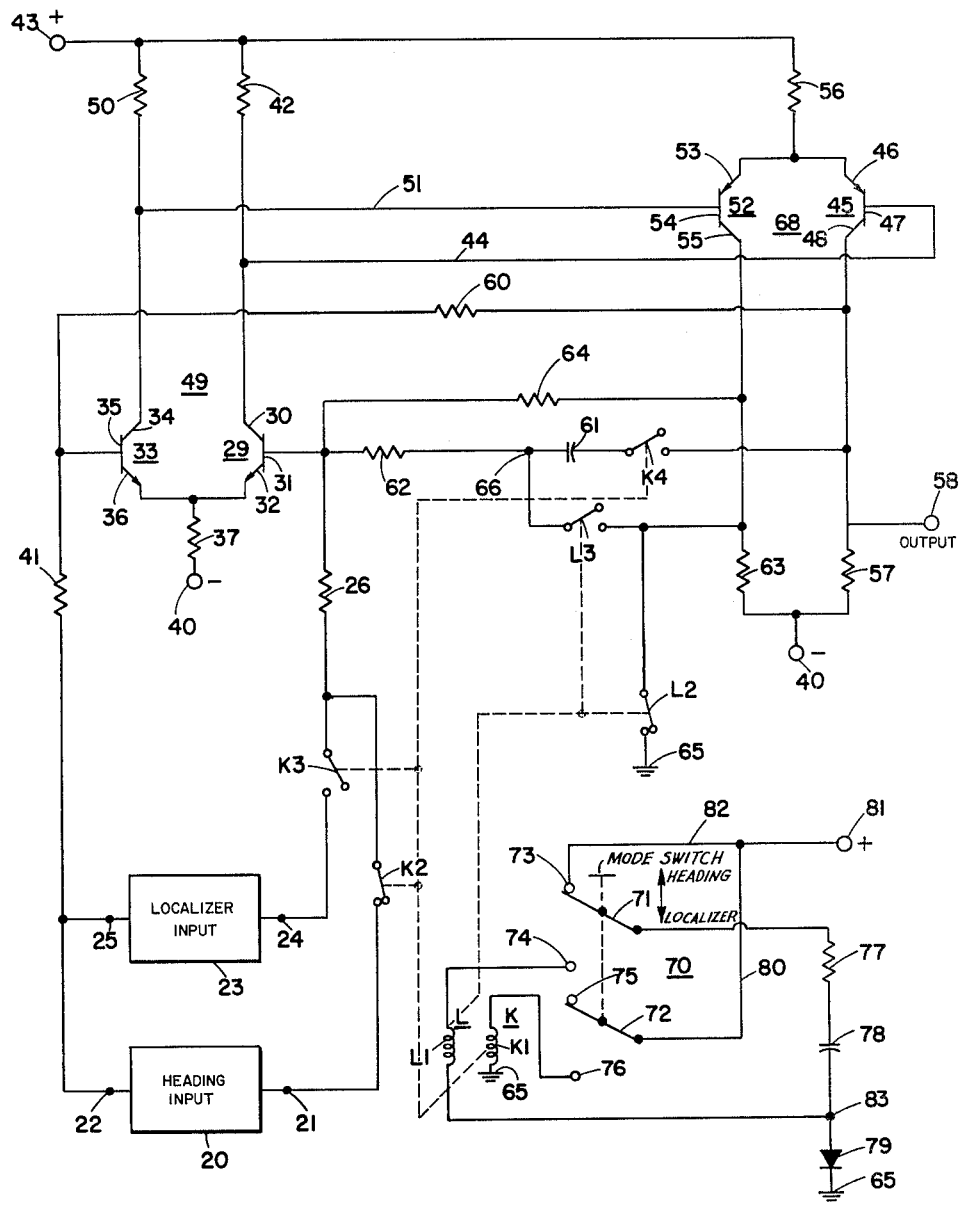

3,213,385
Patented Oct. 19, 1965

1

3,213,385
CONTROL APPARATUS FOR PREVENTING
AMPLIFIER SATURATION
Daniel J. Sikorra, Champlin, Minn., assignor to
Honeywell Inc., a corporation of Delaware
Filed Nov. 2, 1961, Ser. No. 149,618
2 Claims. (Cl. 330—51)

This invention pertains to amplifier circuits and more particularly to amplifier circuits having more than one function in a particular system. With the present trend toward microminiaturized components and smaller and lighter circuits, it is a distinct advantage, not only from a reliability standpoint but from a cost and competitive standpoint as well, to be able to use a single amplifier for a multitude of functions. This is particulary true where the system functions are performed sequentially rather than simultaneously and all amplifiers not performing multiple functions sit idle after completing their particular operation.

Multiple use amplifiers find particular application in the field of autopilots. This is true because the autopilot will operate in sequential steps, that is it will first operate in a "heading" mode and then, as the aircraft approaches its destination, the autopilot will be switched to its ILS, specifically its "localizer" mode.

When the autopilot is in its "heading" mode, the heading amplifier will receive its control signal from the aircraft compass or gyro. Since the deviation correction signal from the compass or gyro is independent whether the aircraft is far away from its destination or near its destination the heading amplifier is normally operated as a constant gain straight proportional amplifier.

The localizer amplifier, however, receives its deviation correction signal from a space fixed directional landing beam and therefore the strength of the deviation signal will be greater when the aircraft is near its destination than it will be when the aircraft first locks on the landing beam. Furthermore, the landing beam width becomes narrower as the aircraft approaches its destination and therefore it becomes increasingly difficult to stably operate the aircraft upon the landing beam. It is therefore necessary that the localizer amplifier operate as a proportional plus rate amplifier so that the autopilot can sense the rate of change of aircraft deviation from the landing beam.

In order to use the same amplifier in the "heading" mode and in the "localizer" mode it is necessary to provide a means of adding a rate component to the amplifier output when the autopilot is switched to ILS. This can be accomplished by switching a rate network into the amplifier feedback loop. However, a serious problem exists during the time immediately following the switching of the autopilot from "heading" to "localizer" due to the fact that the localizer input signal is not zero at the time of switching. The finite localizer step signal produces a sudden positive feedback current through the uncharged rate capacitor in the rate feedback network, thereby saturating the amplifier for an unacceptably long time. The recovery time of the amplifier will normally be so great that the aircraft will have flown through the landing beam.

In a broad sense this invention comprises a means for precharging or preconditioning the rate capacitor to a value corresponding to the initial "localizer" input before the capacitor is connected into the amplifier feedback loop, thereby eliminating the sudden positive feedback surge and preventing the amplifier from saturating.

It is an object of my invention therefore to provide an amplifier circuit capable of performing multiple functions.

2

Another object of my invention is to provide an amplifier circuit capable of performing as a proportional amplifier or as a proportional plus rate amplifier.

A further object of my invention is to provide a means for scheduling the feedback in an amplifier circuit.

These and other objects of my invention will become apparent to those skilled in the art upon consideration of the accompanying specification, claims, and drawing of which:

The single figure is a schematic representation of an embodiment of this invention.

Referring to the figure, there is shown a source of heading input signals 20 having output terminals 21 and 22, and a source of localizer input signals 23 having output terminals 24 and 25. Output terminal 21 of input source 20 is connected by means of a normally closed relay contact K2 of a relay K, and a resistor 26 to a base 31 of a transistor 29.

Relay K further has a winding K1, a normally open contact K3, and a normally opened contact K4. By a normally opened contact is meant a contact which is opened when relay winding K1 is deenergized, and by a normally closed contact is meant a contact which is closed when relay winding K1 is deenergized.

Output terminal 24 of source 23 is connected by means of the normally open relay contact K3 and the resistor 26 to the base 31 of transistor 29.

Transistor 29 further has a collector 30 and an emitter 32. Emitter 32 of transistor 29 is directly connected to an emitter 36 of a transistor 33, and by means of a resistor 37 to a negative source of energizing potential 40. Transistor 33 further has a collector 34 and a base 35. Base 35 of transistor 33 is connected by means of a resistor 41 to the output terminals 22 and 25 of input signal sources 20 and 23 respectively.

Collector 30 of transistor 29 is connected by means of a resistor 42 to a source of positive energizing potential 43, and by means of a conductor 44 to a base 47 of a transistor 45. Transistor 45 further has an emitter 46 and a collector 48.

Collector 34 of transistor 33 is connected by means of a resistor 50 to the positive potential source 43 and by means of a conductor 51 to a base 54 of a transistor 52. Transistor 52 further has an emitter 53 and a collector 55.

Transistor 29 and 33 and their associated circuitry comprise a first stage of difference amplification 49.

Emitter 46 of transistor 45 is directly connected to emitter 53 of transistor 52. Emitter 46 of transistor 45 is further connected by means of a resistor 56 to the positive potential source 43.

Collector 48 of transistor 45 is connected by means of a resistor 57 to the negative potential source 40 and by means of a resistor 60 to the base 35 of transistor 33. Collector 48 of transistor 45 is directly connected to an amplifier output terminal 58 and is further connected by means of the normally opened contact K4 in series with a capacitor 61 and a resistor 62 to the base 31 of transistor 29.

Collector 55 of transistor 52 is connected by means of a resistor 63 to the negative potential source 40 and by means of a resistor 64 to the base 31 of transistor 29. Collector 55 of transistor 52 is further connected by means of a normally closed relay contact L2 to ground 65 and by means of a normally opened relay contact L3 to a junction 66 between capacitor 61 and resistor 62. Relay contacts L2 and L3 are contacts of a relay L further having a winding L1.

Transistors 45 and 52 and their associated circuitry comprise a second stage of difference amplification 68.

A double-pole double-throw switch 70 has a first movable contact 71, a second movable contact 72, a first fixed contact 73, a second fixed contact 74, a third fixed contact 75 and a fourth fixed contact 76. Switch 70 is operable between a first condition wherein movable contact 71 makes connection with fixed contact 73 and movable contact 72 makes connection with fixed contact 75, and a second condition wherein movable contact 71 makes connection with fixed contact 74 and movable contact 72 makes connection with fixed contact 76.

Movable contact 71 is connected by means of a resistor 77 in series with a capacitor 78 and a diode 79 to ground 65. Movable contact 72 is connected by means of a conductor 80 to a positive source of energizing potential 81. Fixed contact 73 is connected by means of a conductor 82 to the positive potential source 81. Fixed contact 74 is connected by means of relay winding L1 to a junction 83 between capacitor 78 and diode 79. Fixed contact 76 is connected by means of relay winding K1 to ground 65.

Operation

In considering the operation of the circuit of the figure assume that switch 70 is in its first condition, that is, movable contact 71 is connected to fixed contact 73 and movable contact 72 is connected to fixed contact 75. In this position a current will flow from potential source 81 through conductor 82, fixed contact 73, movable contact 71, resistor 77, capacitor 78 and diode 79 to ground 65. This current flow will charge capacitor 78 to substantially the source voltage.

With switch 70 in its first condition, relay K and relay L are both deenergized and therefore the "heading" input signal source 20 is connected to the input amplification stage 49 by means of the normally closed contact K2. Furthermore, the localizer input source 23 is isolated from the amplifier input by the normally opened contact K3, the rate feedback circuit comprising capacitor 61 and resistor 62 is removed from the feedback loop by means of the normally opened contacts K4 and L3, and the collector 55 of transistor 52 is grounded by means of the normally closed relay contact L2.

Assume that the output of the heading input signal source 20 is of a polarity such that terminal 21 is positive with respect to terminal 22. This signal will bias transistors 29 and 33 such that the conduction of transistor 29 increases while the conduction of transistor 33 decreases. The current flow path for transistor 29 is from the positive potential source 43 through resistor 42, collector 30 to emitter 32 of transistor 29, and resistor 37 to the negative source 40. Similarly, the current flow path for transistor 33 is from the positive potential source 43 through resistor 50, collector 34 to emitter 36 of transistor 33, and resistor 37 to the negative potential source 40.

The increase in conduction of transistor 29 causes conductor 44 to become less positive while the decreasing conduction of transistor 33 causes conductor 51 to become more positive. The negative going voltage on conductor 44 biases transistor 45 so as to increase the conduction of this transistor, while the positive going potential on conductor 51 biases transistor 52 so as to decrease the conduction of this transistor.

The current flow path for transistor 45 is from the positive potential source 43 through resistor 56, emitter 46 to collector 48 of transistor 45, and resistor 57 to the negative potential source 40. The current flow path for transistor 52 is from the positive potential source 43, through resistor 56, emitter 53 to collector 55 of transistor 52, and resistor 63 to the negative potential source 40. The increase in conduction of transistor 45 causes the collector 48 of this transistor to go more positive, while the decrease in conduction of transistor 52 causes its collector 55 to go more negative.

The increased negative signal on the collector 55 of transistor 52 is coupled through resistor 64 to the base 31 of transistor 29 thereby decreasing the conduction of transistor 29. Similarly, the positive going signal on the collector 48 of transistor 45 is coupled through resistor 60 to the base 35 of transistor 33 thereby increasing the conduction of transistor 33. Both of these feedback signals are degenerative and are used to stabilize the amplifier. The amplifier output signal is taken from the collector 48 of transistor 45 and appears at output terminal 58.

As will be understood from the above explanation the amplifier operates as a straight proportional amplifier when in the heading mode.

Assume now that in preparation to landing his aircraft at his destination the pilot switches switch 70 from its first operating position to its second operating position, so that movable contact 71 is now connected to fixed contact 74 and movable contact 72 is now connected to fixed contact 76. In order to more properly explain the problems that arise during this switching operation, assume for the moment that relay L has been removed from the circuit. With switch 70 in its second operating position, current will flow from the positive potential source 81, through conductor 80, movable contact 72, fixed contact 76 and relay winding K1 to ground 65. The current flow through relay winding K1 will activate relay K so as to open relay contact K2 and close relay contacts K3 and K4. With relay winding K3 closed the localizer input signal source 23 will now be connected to the input amplification stage 49.

It should be understood that since the aircraft is already in the area of the landing beam there will be an initial signal at the output of the localizer input signal source 23 when relay contact K3 closes. For the purpose of explanation assume that this initial signal is a step input of a polarity such that localizer output terminal 24 is positive with respect to terminal 25. As explained previously with respect to the positive heading input signal, this positive signal will be coupled through relay contact K3 to the bases 31 and 35 of transistors 29 and 33 respectively so as to increase the conduction of transistor 29 and decrease the conduction of transistor 33. The increase of conduction of transistor 29 produces a signal on conductor 44 which increases the conduction of transistor 45 while the decrease in the conduction of transistor 33 produces a signal on conductor 51 which decreases the conduction of transistor 52.

The increase in conduction of transistor 45 produces a positive signal on the collector 48 of transistor 45 which is coupled through relay contact K4, capacitor 61, and resistor 62 to the base 31 of transistor 29. This positive feedback will aid the input signal and further increase the conduction of transistor 29. Since capacitor 61 was uncharged when it was connected in the feedback loop upon the closing of relay contact K4, the initial surge of positive feedback current due to the presence of the initial localizer input signal will saturate the amplifier. The amplifier will remain saturated until the charge on the rate feedback capacitor 61 reaches equilibrium, which may take several seconds, during which time the autopilot is inoperative.

This initial saturating of the amplifier is prevented as follows: when switch 70 is switched to its second operating position, relay K is energized. Assuming that relay L is back in the circuit, a second current will flow from capacitor 78 through resistor 77, movable contact 71, fixed contact 74 and relay winding L1 to the other side of capacitor 78. This discharge current of capacitor 78 will energize relay L and will temporarily open relay contact L2 and close relay contact L3. The energization time of relay L will be determined by the RC discharge time of capacitor 78 and resistance of relay winding L1.

The closing of relay contact L3 accomplishes two specific functions. First it connects capacitor 61 from the collector 55 of transistor 52 directly to the collector 48 of transistor 45. In other words, capacitor 61 is now connected directly across the differential output of the differential amplifier stage 63. Secondly the closing of relay contact L3 completes the connection from the collector 55 of transistor 52 through resistor 62 to the base 31 of transistor 29, thereby providing a further degenerative feedback loop. The impedance of resistor 62 is approximately equal to the parallel impedance of resistor 60 and resistor 64, so that the completion of a degenerative feedback loop through resistor 62 effectively doubles the degenerative feedback and halves the amplifier gain. It should be noted that the normal output of the amplifier, from collector 48 of transistor 45, is a single ended output. Since capacitor 61 is connected directly across the differential output of amplifier stage 68, the charge on capacitor 61 would be twice the normal output. However, since the gain of the amplifier was halved the charge on capacitor 61 will be substantially equal to the normal single ended amplifier output.

When capacitor 78 has discharged, relay L will deenergize and relay contact L2 will again close and relay contact L3 will open. The closing of relay contact L2 will again ground the collector 55 of transistor 52 and restore the normal single ended amplifier output, while the opening of relay contact L3 will disconnect capacitor 61 from the collector 55 of transistor 52 and will effectively insert it in the rate feedback loop. Since capacitor 61 is now charged or conditioned to a value proportional to the initial localizer input, there will be no sudden surge of positive feedback current and the amplifier will follow the localizer input signal without saturating.

It is to be understood that while I have shown and described a specific embodiment of my invention, this is for the purpose of illustration only and my invention is to be limited solely by the scope of the appended claims.

I claim as my invention:

1. A multipurpose circuit for amplifying different input signals in different ways comprising: an amplifier having an input and a differential output; first and second input signal means; capacitance means; first relay means having a normally closed contact and first and second normally open contacts, said normally closed contact connecting said first input signal means to the input of said amplifier, said first normally opened contact adapted to connect said second input signal to the input of said amplifier and said second normally opened contact adapted to connect one side of said capacitance means to one side of said differential output; impedance means connecting the other side of said capacitance means to the input of said amplifier; and timing relay means, operative upon the activation of said first relay means, and operable to close for a predetermined time, said timing relay having a normally open contact and a normally closed contact, the normally closed contact of said timing relay connected from the other side of said differential output to a source of reference potential and the normally open contact of said timing relay adapted to connect the other side of said capacitance means to said other side of said differential output whereby, upon activation of said first and second relays, said capacitance means is connected across said differential output, and said impedance means is degeneratively connected from the output to the input of the amplifier so as to decrease the amplifier gain by a predetermined amount, and whereby upon the deactivation of said timing relay after said predetermined time, said capacitance means and said impedance means operate as a positive rate feedback circuit between the output and the input of said amplifier.

2. A multifunction signal amplifying circuit, comprising: a first and second amplifier, each having input and output means, the output means of said first amplifier connected to the input means of said second amplifier; negative feedback means connected from the output means of said second amplifier to the input means of said first amplifier; a first and second source of signal, said sources having output means; means for connecting either the output means of said first signal source or the output means of said second signal source to the input means of said first amplifier; a network comprising a series connected resistor and capacitor; means for connecting said network between the output means of said second amplifier and the input means of said first amplifier, said network normally providing a positive rate signal feedback from said second amplifier to said first amplifier; means for initially charging the capacitor in said network to a potential state that is a function of the signal from said second signal source whenever the output means of said second signal source is connected to the input means of said first amplifier; and, means for operatively connecting said network between the output means of said second amplifier and the input means of said first amplifier whenever the output means of said second signal source is connected to the input means of said first amplifier and after the capacitor in said network has been initially charged, the charged capacitor preventing the positive rate feedback signal from said second amplifier from saturating said first amplifier.

References Cited by the Examiner

UNITED STATES PATENTS

| 2,729,741 | 1/56 | Chapman | 328—154 |
| 2,766,378 | 10/56 | Sundin et al. | 328—154 |
| 2,988,702 | 6/61 | Newbold | 328—151 X |
| 3,041,479 | 6/62 | Sikorra | 307—110 X |

FOREIGN PATENTS

| 1,241,040 | 8/60 | France. |

ROY LAKE, *Primary Examiner.*

NATHAN KAUFMAN, *Examiner.*